United States Patent [19]

Schneider et al.

[11] Patent Number: 5,284,429
[45] Date of Patent: Feb. 8, 1994

[54] GAS-ASSISTED INJECTION MOLDING APPARATUS

[75] Inventors: David R. Schneider, Grand Rapids; Robert W. Russell, Kentwood; Brett S. Sorola, Bay City, all of Mich.

[73] Assignee: Cascade Engineering, Inc., Grand Rapids, Mich.

[21] Appl. No.: 879,605

[22] Filed: May 7, 1992

[51] Int. Cl.⁵ .................. B29C 45/03; B29C 45/34
[52] U.S. Cl. ................................. 425/130; 425/542; 425/812; 264/572
[58] Field of Search .......... 264/85, 572, 328.1, 264/328.8, 328.12; 425/812, 130, 542

[56] References Cited

U.S. PATENT DOCUMENTS

| | | | |
|---|---|---|---|
| 2,331,688 | 10/1943 | Hobson | 18/5 |
| 2,345,144 | 3/1944 | Opavsky | 18/47.5 |
| 2,714,747 | 8/1955 | Lindemann et al. | 18/48 |
| 2,714,748 | 8/1955 | Stirnemann et al. | 18/48 |
| 2,940,123 | 6/1960 | Beck et al. | 18/30 |
| 3,021,559 | 2/1962 | Strong | 18/5 |
| 3,135,640 | 6/1964 | Kepka et al. | 156/147 |
| 3,687,582 | 8/1972 | Hendry et al. | 425/4 |
| 3,751,271 | 8/1923 | Kimura et al. | 425/812 |
| 3,809,733 | 5/1974 | Sandiford et al. | 425/812 |
| 3,972,970 | 8/1976 | Taylor | 264/45.9 |
| 4,033,710 | 7/1977 | Hanning | 425/543 |
| 4,078,875 | 3/1978 | Eckardt | 425/217 |
| 4,082,226 | 4/1978 | Appleman et al. | 239/583 |
| 4,092,389 | 5/1978 | Sakurai | 264/89 |
| 4,101,617 | 7/1978 | Friederich | 264/93 |
| 4,106,887 | 8/1978 | Yasuike et al. | 425/549 |
| 4,129,635 | 12/1978 | Yasuike et al. | 264/45.5 |
| 4,136,220 | 1/1979 | Olabisi | 428/35 |
| 4,140,672 | 2/1979 | Kataoka | 264/45.1 |
| 4,165,062 | 8/1979 | Mitchell | 425/812 |
| 4,234,642 | 11/1980 | Olabisi | 428/188 |
| 4,247,515 | 1/1981 | Olabisi | 264/500 |
| 4,357,296 | 11/1982 | Hafele | 264/532 |
| 4,474,717 | 10/1984 | Hendry | 264/45.5 |
| 4,555,225 | 11/1985 | Hendry | 425/4 R |
| 4,601,870 | 7/1986 | Sasaki | 264/572 |
| 4,604,044 | 8/1986 | Hafele | 425/525 |
| 4,685,881 | 8/1987 | Sasaki | 425/562 |
| 4,740,150 | 4/1988 | Sayer | 425/542 |
| 4,855,094 | 8/1989 | Hendry | 264/40.3 |
| 4,917,594 | 4/1990 | Gellert et al. | 264/572 |
| 4,927,865 | 5/1990 | Duthaler et al. | 522/48 |
| 4,935,191 | 6/1990 | Baxi | 264/572 |

(List continued on next page.)

FOREIGN PATENT DOCUMENTS

| | | |
|---|---|---|
| 1460101 | 12/1976 | European Pat. Off. |
| 1487187 | 9/1977 | European Pat. Off. |
| 1929343 | 12/1970 | Fed. Rep. of Germany |
| 2106546 | 8/1972 | Fed. Rep. of Germany |
| 2461580 | 7/1975 | Fed. Rep. of Germany |

(List continued on next page.)

*Primary Examiner*—Catherine Timm
*Attorney, Agent, or Firm*—Varnum, Riddering, Schmidt & Howlett

[57] ABSTRACT

A thermoplastic article can be injection molded in a mold (10) which includes a cavity (28) defining the shape of the article, at least one thermoplastic entry aperture (23) which is adapted to receive molten thermoplastic resin from a nozzle (22) of an injection molding machine (24), a thermoplastic flow path (21, 26, 30) communicating with the thermoplastic entry aperture and the cavity, and a fluid flow passageway (32, 34) extending into the mold. The fluid flow passageway extends from an exterior surface of the mold to the thermoplastic flow path. A low viscosity fluid such as a gas can be injected through the fluid flow passageway and into the thermoplastic flow path. An end portion (44) of the fluid is flow passageway adjacent the thermoplastic flow path has a porous me lug (50) disposed therein. The porous metal plug includes a porous metal core (64) which permits the low viscosity fluid to flow therethrough but prevents the passage of molten plastic therethrough. The porous metal core can be a sintered metal. Alternatively, the fluid flow passageway can extend from an exterior surface of the mold directly to the mold cavity, rather than the thermoplastic flow path.

20 Claims, 5 Drawing Sheets

U.S. PATENT DOCUMENTS

| | | | |
|---|---|---|---|
| 4,943,407 | 7/1990 | Hendry | 264/40.3 |
| 5,028,377 | 7/1991 | Hendry | 264/572 |
| 5,039,463 | 8/1931 | Loren | 264/40.3 |
| 5,044,924 | 9/1991 | Loren | 425/542 |
| 5,047,183 | 9/1991 | Eckardt et al. | 264/40.3 |
| 5,049,056 | 9/1991 | Baxi et al. | 425/130 |
| 5,066,214 | 11/1991 | Baxi et al. | 425/190 |
| 5,075,056 | 12/1991 | Umlauft et al. | 264/85 |
| 5,080,570 | 1/1992 | Baxi et al. | 264/572 |
| 5,096,655 | 3/1992 | Baxi et al. | 264/572 |
| 5,137,680 | 8/1992 | Hendry | 264/328.12 |
| 5,164,200 | 11/1992 | Johnson | 264/572 |
| 5,186,884 | 2/1993 | Hendry | 264/328.12 |

FOREIGN PATENT DOCUMENTS

| | | | |
|---|---|---|---|
| 3927122 | 2/1991 | Fed. Rep. of Germany | 264/572 |
| 2256021 | 7/1975 | France . | |
| 50-71756 | 6/1975 | Japan . | |
| 55-95547 | 7/1980 | Japan . | |
| 61-258720 | 11/1986 | Japan | 425/812 |
| 3-009820 | 1/1991 | Japan | 264/572 |
| 2139548A | 11/1984 | United Kingdom . | |

```
┌─────────────────────────────────────────────────┐
│   PROVIDE A MOLD WITH A FLUID FLOW PASSAGEWAY   │
│    EXTENDING FROM AN EXTERIOR SURFACE OF THE    │
│   MOLD TO A THERMOPLASTIC FLOW PATH OR MOLD     │
│    CAVITY IN THE MOLD AND SECURE A FLUID        │
│    INLET INSERT OR PLUG IN AN END OF THE        │
│    FLUID FLOW PASSAGEWAY, THE PLUG COMPRISING   │
│    A POROUS METAL WHICH IS ADAPTED TO PERMIT    │
│    THE FLOW OF FLUID THERETHROUGH BUT PREVENT   │
│    THE PASSAGE OF THERMOPLASTIC THERETHROUGH    │
└─────────────────────────────────────────────────┘
                        │
         ┌──────────────────────────────┐
         │ CLAMP THE HALVES IF THE MOLD │
         │           TOGETHER           │
         └──────────────────────────────┘
                        │
      ┌────────────────────────────────────┐
      │  INJECT MOLTEN THERMOPLASTIC RESIN │
      │  INTO THE THERMOPLASTIC FLOW PATH  │
      │  IN A QUANTITY SUFFICIENT TO       │
      │  IMMERSE THE PLUG IN MOLTEN        │
      │         THERMOPLASTIC RESIN        │
      └────────────────────────────────────┘
                        │
     ┌──────────────────────────────────────┐
     │  INJECT LOW VISCOSITY FLUID SUCH AS  │
     │  A GAS THROUGH THE FLUID FLOW        │
     │  PASSAGEWAY, THROUGH THE PLUG, AND   │
     │  INTO THE MOLTEN RESIN TO DISTRIBUTE │
     │  THE MOLTEN RESIN WITHIN THE MOLD    │
     │           CAVITY OF THE MOLD         │
     └──────────────────────────────────────┘
                        │
      ┌────────────────────────────────────┐
      │  CONTAIN THE FLUID UNDER PRESSURE  │
      │  WITHIN THE RESIN UNTIL THE RESIN  │
      │  COOLS TO A STRUCTURALLY SELF-     │
      │  SUPPORTING STATE TO FORM A        │
      │       THERMOPLASTIC ARTICLE        │
      └────────────────────────────────────┘
                        │
     ┌──────────────────────────────────────┐
     │  VENT THE FLUID OUT OF THE ARTICLE,  │
     │  THROUGH THE PLUG, AND THROUGH THE   │
     │  FLUID FLOW PASSAGEWAY TO A POINT    │
     │  OUTSIDE THE MOLD, WHEREBY THE PLUG  │
     │  PREVENTS THERMOPLASTIC RESIN FROM   │
     │  PASSING THROUGH IT AND ENTERING     │
     │       THE FLUID FLOW PASSAGEWAY      │
     └──────────────────────────────────────┘
                        │
            ┌─────────────────────────┐
            │ SEPARATE THE MOLD HALVES│
            └─────────────────────────┘
                        │
          ┌──────────────────────────────┐
          │ REMOVE THE ARTICLE FROM THE  │
          │            MOLD              │
          └──────────────────────────────┘
```

FIG. 8

GAS-ASSISTED INJECTION MOLDING APPARATUS

BACKGROUND OF THE INVENTION

Field of the Invention

This invention relates to gas-assisted injection molding of thermoplastic articles. In one of its aspects, the invention relates to a mold having an improved means for injecting a fluid such as a gas into an injected thermoplastic material. In another of its aspects, the invention relates to a process for injection molding a thermoplastic article wherein a fluid such as a gas is injected into the molten thermoplastic through an improved plug which permits passage of the fluid therethrough but which prohibits flow of thermoplastic material therethrough.

Description of the Related Art

British Patent Specification No. 2 139 548 discloses a process for injection molding comprising the steps of introducing plastic material into a mold cavity and, at one or more selected positions, separately introducing a pressurized fluid such as a gas into the stream of plastics material to thereby fill the mold cavity and create a gas-containing cavity in the plastic material. The plastic material flows throughout the mold cavity with the gas-containing cavity within the plastic material. The gas pressure is maintained within the gas-containing cavity to hold the plastic material positively against the mold surfaces as the plastic material solidifies and cools to the point where the molding can sustain the form dictated by the mold surfaces.

In one embodiment, the pressurized gas is introduced at a position within the mold cavity, and in an alternative embodiment, the gas is introduced upstream of the mold cavity. In each embodiment, the gas is introduced through a passageway after the outlet end of the passageway has been immersed in the plastic material, the gas entering the plastic material and forming the gas-containing cavity therein. At the end of the molding cycle, the gas pressure within the gas-containing cavity is relieved before the mold is opened.

U.S. Pat. No. 4,740,150 to Sayer was intended to be an improvement over the gas injection molding system disclosed in the British Patent Specification No. 2 139 548. U.S. Pat. No. 4,740,150 discloses a retractable gas injection nozzle adapted to be positioned either within the mold cavity or upstream of the mold cavity. In its protracted position, the gas injection nozzle is capable of introducing gas into the mold via a bore extending longitudinally through the nozzle, the bore being connected to a source of pressurized gas. The gas can be vented from the mold by retracting the nozzle away from sealing engagement with a conical valve seat of a valve port in the mold. In the retracted position of the nozzle, gas from the mold can readily pass through the valve port and around the nozzle to the atmosphere.

Although the retractable gas injection nozzle disclosed in U.S. Pat. No. 4,740,150 works well and produces satisfactory moldings, there are several inherent maintenance problems associated with this type of gas injection system. First, the retractable gas injection nozzle has moving parts which tend to wear out the valve seat of the mold and also which wear out themselves. Typically, the nozzle is driven fairly firmly against the valve seat, thereby bending the nozzle or otherwise causing problems. Second, molten plastic tends to flow into the nozzle, thereby clogging the nozzle after a certain amount of time. Third, although a heating element can be provided to surround the nozzle, the heating element tends to wear out relatively frequently. Unless appropriate conditions are maintained very closely, the heating element, which is somewhat expensive, can burn out very quickly. Fourth, the opening in the mold required for receiving the nozzle is relatively large. The positioning of the nozzle is limited by the need to avoid water lines in the mold and by the presence of other items associated with the mold.

U.S. Pat. No. 4,855,094 also relates to fluid-assisted injection molding and discloses a modified mold sprue comprising a disc-shaped insert disposed within a sprue body. Passage segments in the insert provide for the introduction of pressurized fluid to a plastic flow path extending through the sprue. The passage segments open into the plastic flow path through an orifice which is disclosed as being sufficiently small to effectively prevent entry of molten plastic into the passage segments. However, it is believed that plastic may occasionally enter the passage segments and is be very difficult to clean out. The sprue insert would apparently have to be removed and heated, drilled or tapped to remove the hardened plastic. Furthermore, it is believed that the small gas orifice would have to be placed very near the injection nozzle where the molten plastic is the hottest so that the thermoplastic remains molten adjacent the orifice. It is known that as molten plastic flows into a mold, it solidifies along the side walls of the mold. If the hardened plastic shell is too thick, any gas entering the mold from a small orifice would probably not be able to penetrate the plastic shell. If the gas does not penetrate the plastic shell, a spiraling would then probably take place, wherein gas would spiral around the outside of the plastic rather than penetrating the plastic to push the plastic into the mold. Therefore, it is believed that the small gas orifice would have to be placed near the thermoplastic resin injection nozzle where the molten plastic is hottest and that the small gas orifice could be inoperative if placed further downstream in the plastic flow path near the mold gate.

There is a need for a mold and a fluid-assisted injection molding process wherein the entry of thermoplastic material into a fluid supply passageway is prevented without the use of moving parts in the mold, and wherein the outlet end of the fluid supply passageway can be positioned along the thermoplastic flow path or in the mold cavity itself.

SUMMARY OF THE INVENTION

A mold for use in the injection molding of a thermoplastic article can comprise a cavity defining the shape of a thermoplastic article, at least one thermoplastic entry aperture which is adapted to receive molten thermoplastic resin from a nozzle of an injection molding machine, a thermoplastic flow path in fluid communication with the is thermoplastic entry aperture and with the cavity, and a fluid flow passageway extending from an exterior surface of the mold to the thermoplastic flow path. A fluid can be injected through the fluid flow passageway and communicated to the thermoplastic flow path. The fluid flow passageway includes an end portion adjacent the thermoplastic flow path, the end portion having a plug disposed therein, the plug comprising a porous core. The porous core permits the flow of low viscosity fluid such as a gas therethrough but prevents the passage of molten thermoplastic therethrough.

Preferably, the end portion of the fluid flow passageway is threaded, and the plug is threaded into the passageway end portion. The thermoplastic flow path can include a sprue passageway, and the fluid flow passageway can extend into the thermoplastic flow path at a point between the sprue passageway and the mold cavity. The porous core can comprise a sintered material which is selected from the group consisting of aluminum, copper, nickel, steel, bronze, porcelain and brass. The plug can comprise a hollow threaded nut filled with a sintered material. Further, an end of the plug can be substantially flush with the walls of the mold defining the thermoplastic flow path.

The mold preferably comprises a selectively rotatable cylinder which is closed at its forward end with a cap, wherein the fluid flow passageway extends through the cylinder. The cap extends into the thermoplastic flow path and has an opening which defines an outlet for the fluid flow passageway. The outlet is adapted to face different directions within the thermoplastic flow path upon selective rotation of the cylinder to thereby permit directional control of a fluid injection into the thermoplastic flow path.

Alternatively, the mold can comprise a cavity, a thermoplastic entry aperture, a thermoplastic flow path, and a fluid flow passageway which extends from an exterior surface of the mold to the cavity rather than the thermoplastic flow path. An end of the plug can be substantially flush with adjacent walls of the mold and can form a part of the cavity. The mold preferably comprises a selectively rotatable cylinder which is closed at its forward end with a cap, wherein the fluid flow passageway extends through the cylinder. The cap extends into the cavity and has an opening which defines an outlet for the fluid flow passageway. The outlet is adapted to face different directions within the cavity upon selective rotation of the cylinder to thereby permit directional control of a fluid injection into the cavity.

The invention also relates to an improvement in a process for the injection molding of a thermoplastic article in an injection molding system comprising a resin injection nozzle and a mold, the mold comprising mold halves and a mold cavity defining the shape of a thermoplastic article, an injection aperture for receiving molten resin from the nozzle,, a molten resin flow path in fluid communication with the injection aperture and with the cavity, and a fluid flow passageway extending from an exterior surface of the mold to at least one of the resin flow path and the mold cavity. The process comprises the steps of clamping the mold halves together, injecting molten resin from the nozzle through the injection aperture and into the resin flow path, and injecting a quantity of low viscosity fluid through the fluid flow passageway and into the molten resin at at least one of the resin flow path and the mold cavity to thereby distribute the molten resin within the cavity. The fluid is contained under pressure within the thermoplastic resin until the resin has cooled to a structurally self-supporting state in the cavity to form the thermoplastic article. The fluid is vented out of the article through the fluid flow passageway to a point outside the mold, the mold halves are separated, and the article is removed from the mold.

The improvement comprises a porous plug disposed in an end portion of the fluid flow passageway, the porous plug being adapted to permit the flow of low viscosity fluid therethrough but prevent the passage of thermoplastic therethrough. The low viscosity fluid passes through the porous plug into the mold and is vented from the mold through the porous plug. The low viscosity fluid can be injected into the mold at the resin flow path or at the mold cavity. The porous plug preferably comprises a sintered metal. The resin flow path can comprise a sprue passageway, and the fluid can be injected into the resin flow path at a point between the sprue passageway and the mold cavity.

The mold preferably includes a selectively rotatable cylinder which is closed at its forward end with a cap. The fluid flow passageway can extend through the cylinder, and the cap can extend into the cavity. Because the cap has an opening which defines an outlet for the fluid flow passageway, the cylinder can be selectively rotated prior to the fluid injecting step to control the direction in which the fluid is injected into the cavity.

BRIEF DESCRIPTION OF THE DRAWINGS

The invention will now be described with reference to the drawings in which.

DETAILED DESCRIPTION OF THE PREFERRED EMBODIMENTS

Referring now to the drawings, the invention relates to a mold for use in the injection molding of a thermoplastic article and to a process for the injection molding of a thermoplastic article. The mold is shown in FIGS. 1-7, and the steps of the process are shown in FIG. 8.

Figure 1:
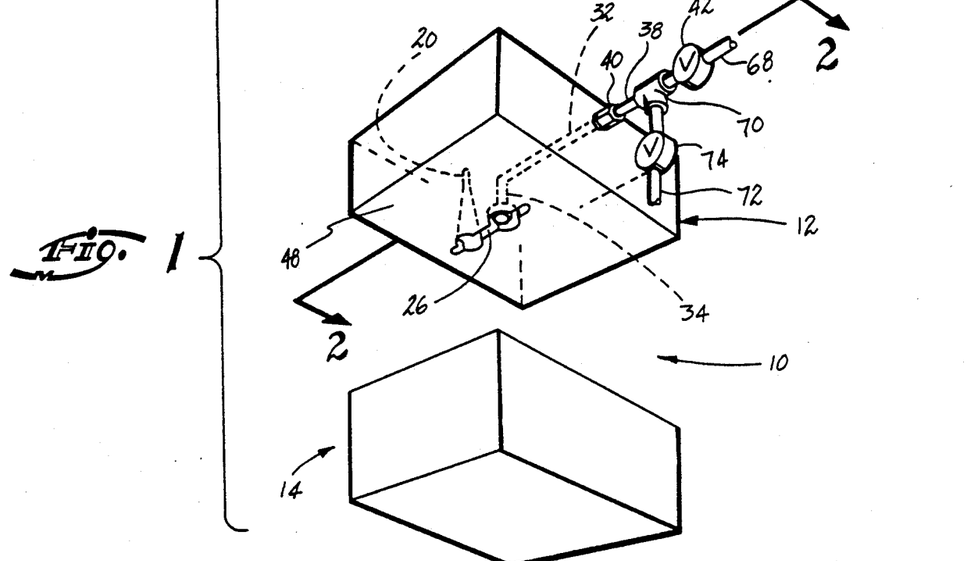
FIG. 1 is a perspective view of a mold according to the invention, showing in dashed lines a sprue insert for the introduction of a thermoplastic material into the mold and fluid passageways for the introduction of a fluid into the mold.
Figure 2:
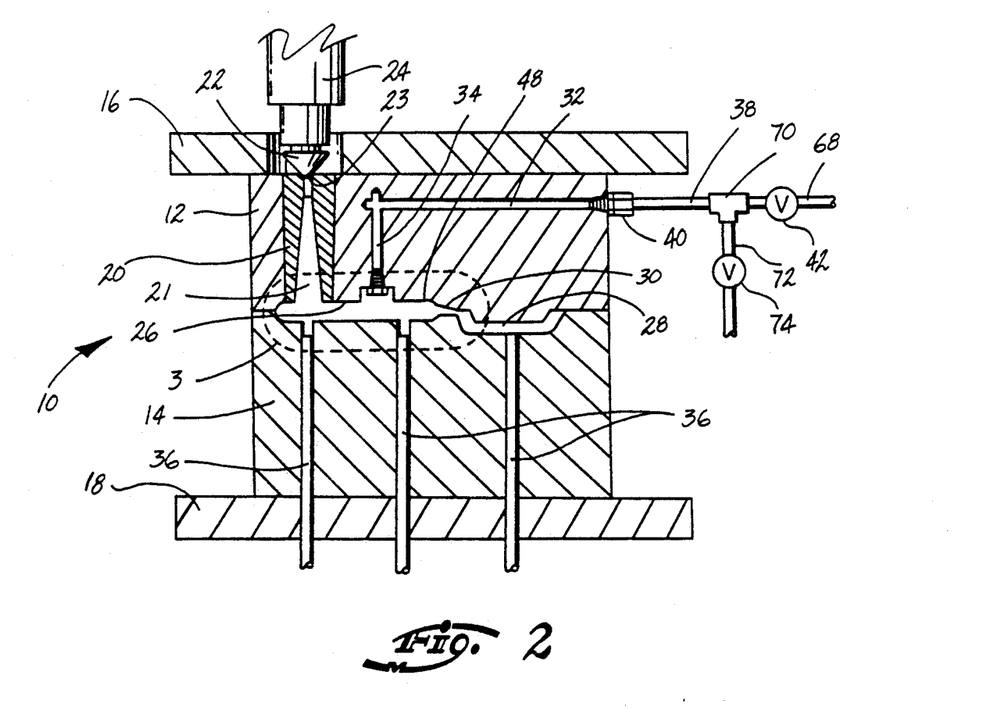
FIG. 2 is a sectional view taken along the lines 2—2 of FIG. 1 and also shows platens and a front end of an injection molding machine.

Referring to FIGS. 1 and 2, a mold 10 according to the invention includes a stationary mold half 12 and a movable mold half 14. The mold halves 12, 14 are secured to a stationary platen 16 and a movable platen 18, respectively. Although not shown in the drawing figures, the movable platen 18 is reciprocally driven by an actuator such as a hydraulic cylinder. Because the movable mold half 14 is secured to the movable platen 18, reciprocal movement of the movable platen 18 causes reciprocal movement of the movable mold half 14 to and away from the stationary mold half 12. As is conventional in injection molding, product ejector pins 36 can extend through the movable platen 18 and through the movable mold half 14 to the face of the mold half 14 which is opposite the movable platen 18. The ejector pins 36 can be protracted at the end of each injection molding cycle to separate the composite article or hardened thermoplastic material from the front face of the movable mold half 14 while or after the mold halves 12 and 14 are separated from each other.

The mold half 12 includes a sprue insert 20 having a sprue passageway 21 which is in fluid communication through a thermoplastic entry aperture 23 with a thermoplastic resin injection nozzle 22 of an injection molding machine 24. Further, the sprue passageway 21 is in fluid communication with a runner cavity 26 which is in turn in communication with a mold cavity 28 via a gate 30. A thermoplastic flow path is defined by the sprue passageway 21, the runner cavity 26 and the gate 30.

The stationary mold half 12 further includes a first fluid channel or passageway 32 extending from an exterior surface of the stationary mold half 12 to a second fluid passageway or channel 34 disposed within the mold half 12. The second fluid passageway 34 opens into the thermoplastic flow path at the runner cavity 26, and thus, is in fluid communication with the runner cavity 26. The end of the first fluid passageway 32 which opens to an exterior surface of the mold half 12 has a fluid conduit 38 secured to it through a fitting 40. The fluid conduit 38 is connected to a source of fluid pressure (e.g., $N_2$) through a T connector 70 and a fluid supply conduit 68. The fluid conduit 38 is also connected to an exhaust conduit 72 through the T connector 70 and a valve 74. The flow of fluid through the exhaust conduit 72 is selectively controlled by the valve 74. A valve 42 in the fluid conduit 68 can selectively control the introduction of fluid under pressure to the fluid passageways 32, 34.

Figure 3:
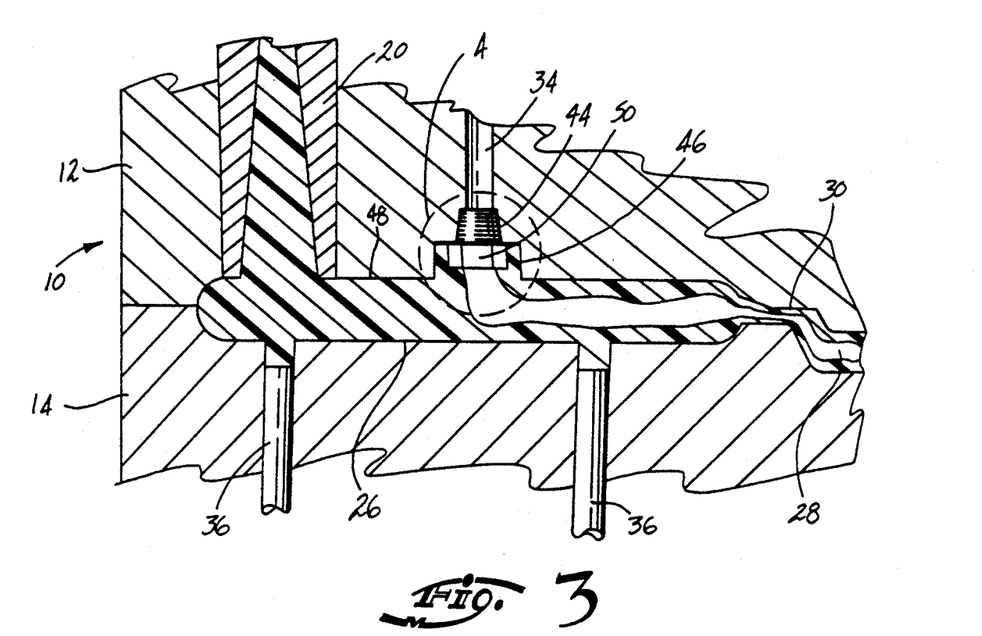
FIG. 3 is an enlarged view of an area shown in FIG. 2, showing a typical path of flow of a fluid through a shot of injected thermoplastic material.
Figure 4:
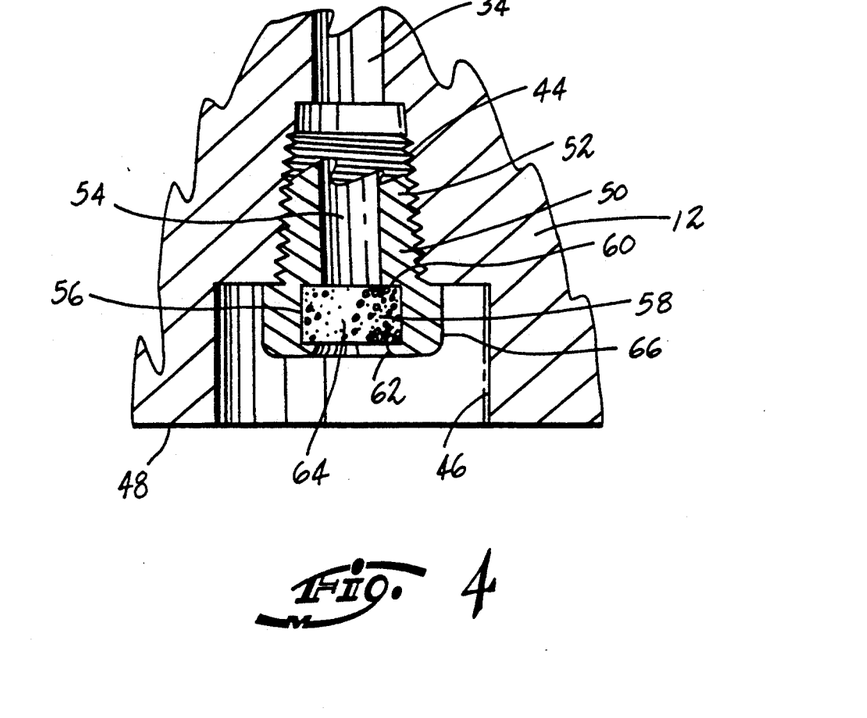
FIG. 4 is an enlarged view of an area shown in FIG. 3, showing a fluid inlet insert or plug comprising a porous metal core according to the invention.

Referring to FIGS. 3 and 4, the second fluid passageway 34 includes at its end which is opposite the first is fluid passageway 32 an enlarged portion 44 which is threaded. The enlarged portion 44 opens into a recess 46 provided in a forward wall 48 of the stationary mold half 12. A fluid inlet insert or plug 50 is threaded into the enlarged portion 44. Although the fluid inlet insert 50 has been shown in the drawings as being recessed from the forward wall 48, the outer end of the fluid inlet insert 50 can be disposed flush with the forward wall 48 or can protrude somewhat from the runner cavity 26 and into the thermoplastic flow path.

Referring to FIG. 4, the fluid inlet insert 50 comprises a cylinder 52 provided with a longitudinally extending bore 54, the bore 54 having one end in fluid communication with the second fluid passageway 34 and a second end which opens into a seat 56. The seat 56 is defined by continuous circumferential side walls 58, an annular shoulder 60, and an annular swaged over portion 62 opposing the annular shoulder 60.

A porous core 64 is disposed in the seat 56 and is mechanically secured therein by the annular shoulder 60 and the annular swaged over portion 62. The porous core 64 comprises a suitably porous material such as a sintered stainless steel, sintered brass, sintered copper, sintered nickel, sintered bronze, sintered porcelain, sintered aluminum and alloys thereof or similar material which is sufficiently porous to permit the transfer or permeation of a low viscosity fluid such as a gas in either direction therethrough but which will not permit the transfer or permeation of relatively viscous thermoplastic material in either direction through it. The pore size and density of the porous metal core 64 can vary over a wide range. The pore size of the porous metal core 64 is dictated by the choice of thermoplastic resin used in the injection molding. Generally, if a more viscous thermoplastic resin is used, a more porous (having a larger pore size) core can be used. With most is thermoplastic resins, the porous core 64 should probably have a pore size ranging from about 10 to about 30 microns. Preferably, the porous core 64 comprises a sintered bronze. Examples of suitable materials for porous cores can be found in porous metal filters manufactured by Nupro Company of Willoughby, Ohio, the filters comprising a porous brass, 316SS, Morel nickel-copper alloy, or Hastelloy C nickel-base alloy and having a filter element size (pore size) of 0.5 to 40 microns.

The cylinder 52 of the fluid inlet insert 50 is integral with a hexagonal nut 66 which is disposed in the recess 46. Sufficient space is provided between the hexagonal nut 66 and the recess 46 to permit a conventional tool to be positioned in the recess 46 and around the hexagonal nut 66 to either thread the fluid inlet insert 50 into the enlarged portion 44 or unthread the fluid inlet insert 50 out of the enlarged portion 44.

Figure 5:
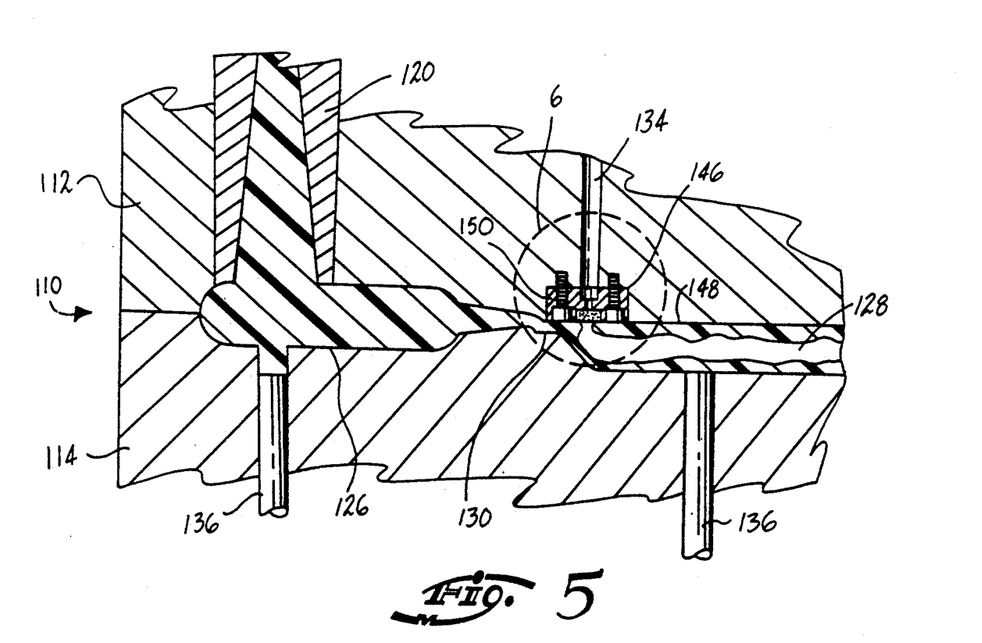
FIG. 5 is a view which is similar to FIG. 3, showing an alternative embodiment of a mold according to the invention.

Referring to FIG. 5, a second embodiment of the mold of the invention is shown in the form of a mold 110. The mold 110 includes a stationary mold half 112 and a movable mold half 114. The stationary mold half 112 includes a sprue 120 for communicating thermoplastic material to a runner 126 which in turn communicates with a mold cavity 128 via a gate 130. A thermoplastic flow path is defined by the sprue 120, the runner 126 and the gate 130. Product ejector pins 136 can extend through the movable mold half 114.

The mold 110 of the second embodiment differs from the mold 10 of the first embodiment in that a second fluid passageway 134 opens into the mold cavity 128 at a position which is preferably near the gate 130, rather than opening into the thermoplastic flow path at the runner 126. Because the second fluid passageway 134 opens into the mold cavity 128, the fluid inlet insert or plug preferably takes the form of a fluid inlet insert or plug 150, rather than the fluid inlet insert 50 (FIG. 4). However, either one of the plugs 50, 150 can be used with either one of the molds 10, 110.

Figure 6:
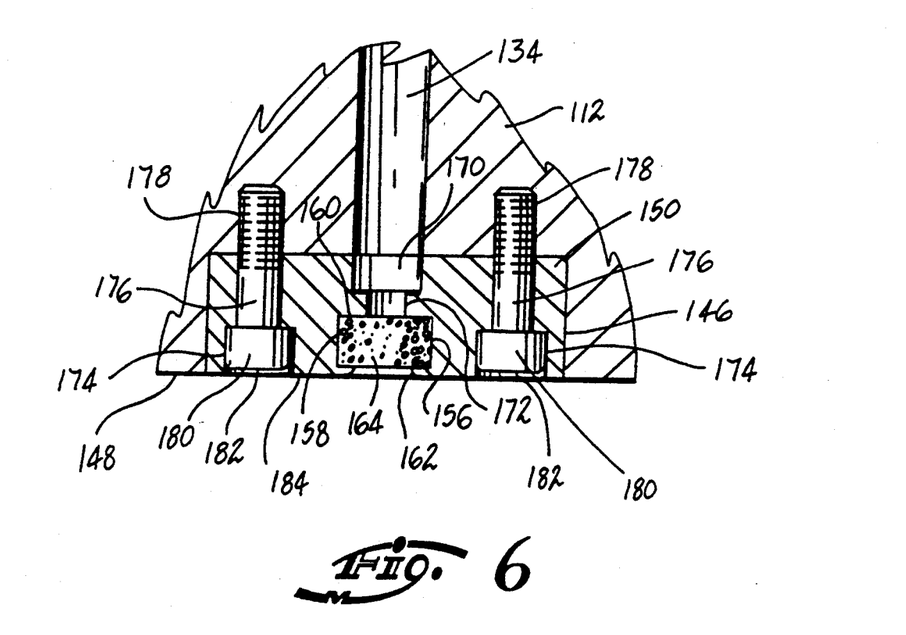
FIG. 6 is an enlarged view of an area shown in FIG. 5, and is similar to the view shown in FIG. 4.

Referring to FIG. 6, the fluid inlet insert 150 is disposed in a recess 146 provided in a forward wall 148 of the stationary mold half 112. The fluid inlet insert 150 includes a centrally disposed counterbore 170. The counterbore 170 includes a reduced diameter portion 172 which fluidly communicates with a seat 156. The seat 156 is defined by continuous circumferential side walls 158, an annular shoulder 160, and an annular swaged over portion 162 which opposes the annular shoulder 160. A porous core 164 is disposed within the seat 156 and is mechanically secured therein by the annular shoulder 160 and the annular swaged over portion 162. The porous core 164 can comprise the same materials as the porous core 64 of the first embodiment.

Circumferentially spaced around the core 164 or center of the fluid inlet insert 150 are two or four counterbores 174 which extend through the fluid inlet insert 150. The counterbores 174 receive fasteners 176 which are in turn threaded into tapped holes 178 in the stationary mold half 112 to thereby secure the fluid inlet insert 150 to the stationary mold half 112. The fasteners 176 preferably include heads 180 having ends 182 which are flush with the forward wall 148 of the stationary mold half 112 and a forward wall 184 of the fluid inlet insert 150. Because of the construction of the fluid inlet insert 150, the forward wall 148 of the stationary mold half 112 and the forward face of the fluid inlet insert 150, such as the forward wall 184, generally lie in a common plane. Thus, the continuity of the walls defining the mold cavity is substantially maintained.

Alternatively, the plug 150 and the recess 146 can be eliminated. The annular shoulder 160 can be formed directly in the bore 134 in the stationary mold half 112. The porous plug 164 can thus be mounted directly in the bore 134 and can be held in place by swaging the end of the bore 134 as portion 162 in FIG. 6.

Figure 7:
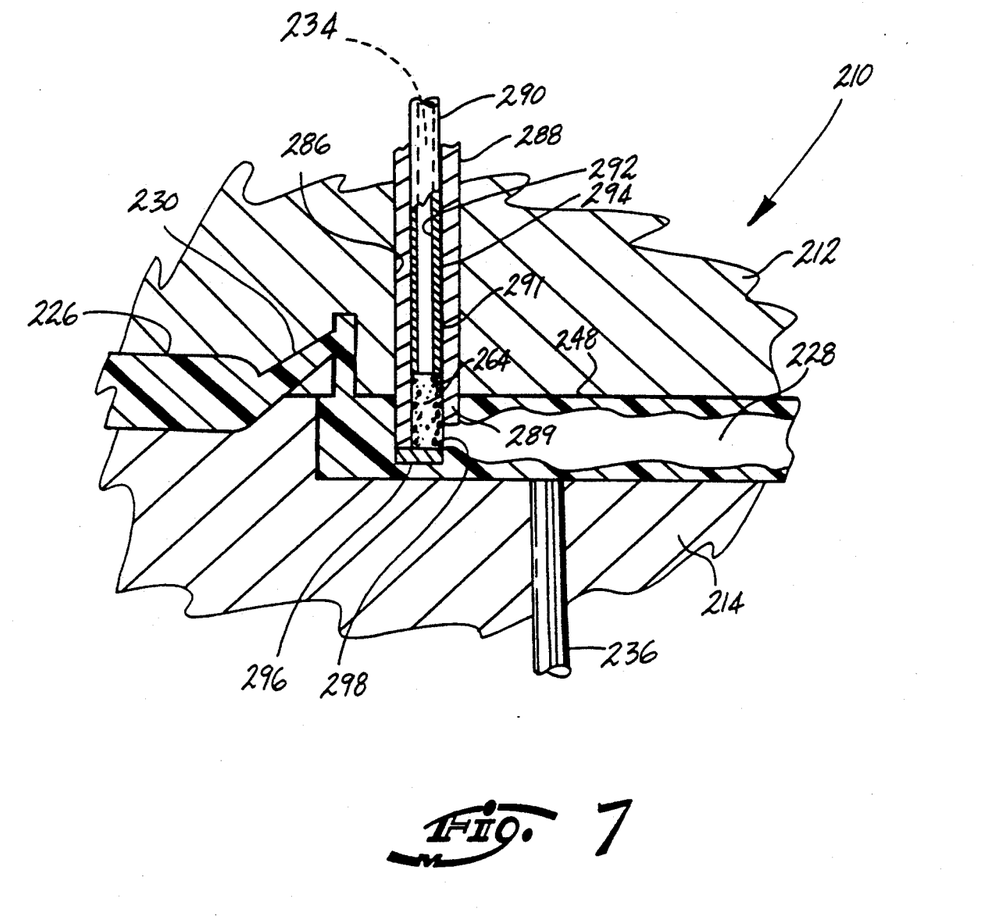
FIG. 7 is a view which is similar to FIG. 3, showing a third embodiment of a mold according to the invention.
Figure 8:
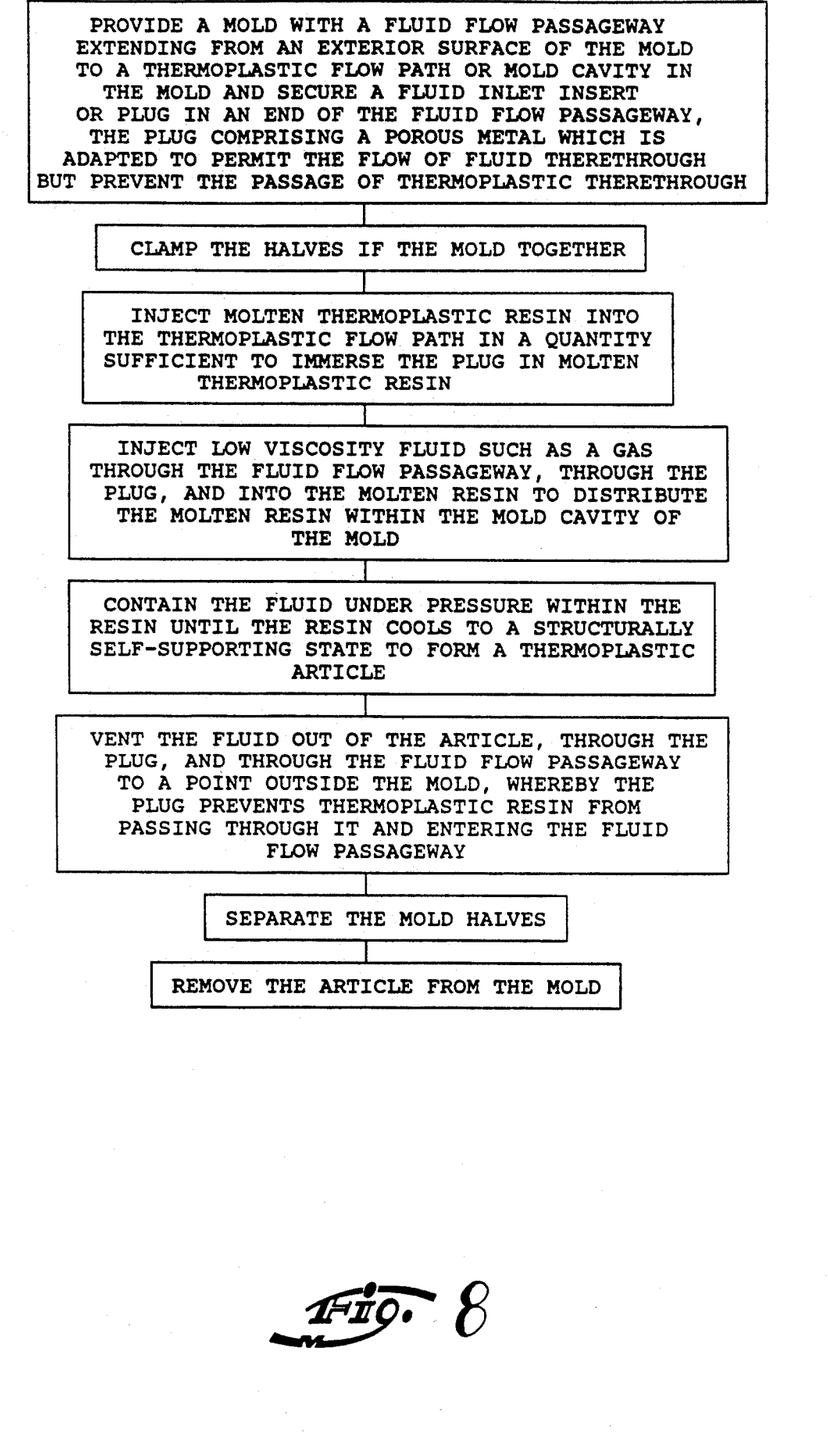
FIG. 8 is a flow chart diagram showing the steps of a process for the injection molding of a thermoplastic article according to the invention.

Referring to FIG. 7, a third embodiment of the mold of the invention is shown in the form of a mold 210. The mold 210 includes a stationary mold half 212 and a movable mold half 214. The stationary mold half 212 includes a runner 226 which is adapted to communicate thermoplastic material to a mold cavity 228 via a gate 230. A thermoplastic flow path is defined in part by the runner 226 and the gate 230. One or more product ejector pins 236 can extend through the movable mold half 214.

Like the mold 110 of the second embodiment, the mold 210 of the third embodiment includes a fluid inlet insert or plug which opens into the mold cavity 228 at a position which is preferably near the gate 230. The fluid inlet insert or plug of the mold of the third embodiment comprises a porous core 264 which is suitably secured in the mold as described below.

The stationary mold half 212 includes a bore 286 which opens into the mold cavity 228. An outer cylinder 288 can be slip fit into the bore 286 so that a forward end 289 of the outer cylinder 288 extends past a forward wall 248 of the stationary mold half 212 and into the mold cavity 228. The outer cylinder 288 includes an annular inside surface 294. An inner cylinder 290 is disposed inside the outer cylinder 288 and includes a forward end 291 which is spaced rearwardly of the forward end 289 of the outer cylinder 288. The inner cylinder 290 includes an annular inside surface 292 which defines the boundaries of a second fluid passageway or channel 234 extending through the inner cylinder 290.

The porous core 264 has a diameter which is at least as large as the diameter of the annular inside surface 292 of the inner cylinder 290, but no larger than the diameter of the annular inside surface 294 of the outer cylinder 288. Further, the porous core 264 extends forwardly from the forward end 291 of the inner cylinder 290 and past the forward end 289 of the outer cylinder 288. An end cap 296 is fastened or welded to the forward end 289 of the outer cylinder 288. The end cap 296 cooperates with the forward end 291 of the inner cylinder 290 in securing the porous core 264 within the outer cylinder 288. The inner cylinder 290 should be secured in the mold half 212 so that its forward end 291 bears against the porous core 264 and so that the porous core bears against the end cap 296. The end cap 296 preferably has a hemispherical shape. The end cap 296 includes a fluid outlet opening 298.

The outer cylinder 288 should be adjustably secured within the bore 286 so that the outer cylinder 288 can be secured in different rotative positions within the bore 286. For instance, the outer cylinder 288 can be suitably keyed to the stationary mold half 212 in a conventional manner. By adjustably securing the outer cylinder 288 within the bore 286 so that the outer cylinder can be rotated to different positions, the fluid outlet opening 298 can thereby be adjusted so that it faces in any desired direction in the mold cavity 228.

Referring to FIG. 2, the mold halves 12, 14 can easily be made by a tool and die maker. The first fluid passageway 32 can be formed by drilling through an exterior wall of the stationary mold half 12, and the second fluid passageway 34 can be formed by drilling through the forward wall 48 of the stationary mold half 12 in such a manner that the first and second fluid passageways 32, 34 communicate with each other. Referring to FIG. 4, the forward wall 48 of the stationary mold half 12 is then drilled to form the recess 46 and tapped to form the enlarged portion 44 in such a manner is that the enlarged portion 44 and the recess 46 are in fluid communication with the second fluid passageway 34. Next, the fluid inlet insert 50 can be purchased from the Norgen Company or manufactured, and then threaded into the enlarged portion 44. The fluid inlet insert 50 can be made by forming the cylinder 52 with a threaded exterior and making the cylinder 52 integral with the hexagonal nut 66. The porous core 64 can then be fitted into the seat 56 prior to formation of the annular swaged over portion 62. The annular swaged over portion 62 is then formed by swaging over portions of the hexagonal nut 66 onto the core 64 to thereby firmly secure the core 64 in the seat 56.

Referring to FIG. 5, the mold 110 comprising the mold halves 112, 114 can be made by drilling through the forward wall 148 of the stationary mold half 112 in the area of the mold cavity 128 and close to the gate 130. Referring to FIG. 6, the fluid inlet insert 150 is easily made by drilling appropriate bores in the insert 150, fitting the porous core 164 into the seat 156, and then swaging over portions of the fluid inlet insert 150 to form the annular swaged over portion 162. Preferably, the counterbores 174 are formed in such a manner that suitably sized fasteners 176 can extend through the fluid inlet insert 150 and into the mold half 112 and have the ends 182 of the their heads 180 flush with the forward wall 184 of the fluid inlet insert 150 and the forward wall 148 of the stationary mold half 112. The fasteners 176 preferably comprise screws which are threaded into tapped holes 178 of the stationary mold half 112 to thereby secure the fluid inlet insert 150 to the stationary mold half 112.

Referring to FIG. 7, the bore 286 of the mold 210 can be made by drilling through the forward wall 248 of the stationary mold half 212 in the area of the mold cavity 228 and close to the gate 230. The outer cylinder 288 can then be adjustably secured inside the bore 286 so that its forward end 289 extends forwardly of the forward wall 248 of the mold half 212. The inner cylinder 290 can then be placed inside the outer cylinder 288. Next, the porous core 264 can be placed inside the outer cylinder 288 at its forward end 289. The end cap 296 is suitably secured, preferably by welding, to the forward end 289 of the outer cylinder 288, thereby securing the porous metal core 264 within the outer cylinder 288. The fluid outlet opening 298 is preferably then formed by milling the end cap 296.

Referring to FIG. 3, in operation, a shot of thermoplastic material is injected into the stationary mold half 12 of the mold 10 through the sprue insert 20. The thermoplastic material travels to the runner cavity 26, fills the recess 46, and flows toward the mold cavity 28. After the thermoplastic material has filled the recess 46 and thereby immersed the fluid inlet insert 50 in molten resin, a low viscosity fluid such as a gas (preferably nitrogen) can be injected into the runner 26. Referring to FIG. 1, the valve 42 is opened to permit gas to flow through the fluid conduit 38, into the first fluid passageway 32 and into the second fluid passageway 34. Referring to FIG. 3, the gas then travels from the second fluid passageway 34 through the fluid inlet insert 50 and into the molten or fluid thermoplastic material in the runner cavity 26. The gas travels or migrates from the runner cavity 26, through the gate 30, and into the mold cavity 28 to thereby form a hollow cavity in the thermoplastic material, as is conventional in fluid-assisted injection molding. After the thermoplastic material in the mold cavity 28 has set up (become structurally self-supporting) and cooled, the gas pressure can be relieved by exhausting the gas through the fluid inlet insert 50 and the second fluid passageways 34 and 32. In this step in the process, the valve 42 is closed and the valve 74 is opened to is exhaust the gas through the conduit 38, the T connection 70, the exhaust conduit 72 and the valve 74. Because the fluid inlet insert 50 permits a transfer or permeation of gas in either direction therethrough, but prevents the transfer or permeation of thermoplastic material therethrough, the gas pressure in the runner cavity 26 and the mold cavity 28 can be reduced to atmospheric pressure without risk of thermoplastic material entering the second fluid passageway 34 and thereby clogging up the second fluid passageway 34.

The operation of the mold 110 is similar to the operation of the mold 10 of the first embodiment. However, referring to FIG. 5, the second fluid passageway 134 transports the injected gas directly to the mold cavity 28 and into an area proximate the gate 130. Thus, the gas directly enters the mold cavity 128 by passing through the fluid inlet insert 150 and then exits the mold cavity 128 by flowing through the fluid inlet insert 150 and into the second fluid passageway 134, without travelling into the gate 130 or the runner cavity 126.

The operation of the mold 210 is similar to the operation of the mold 110. However, unlike the mold 110, the mold 210 is adapted to direct the fluid being injected in different directions in the mold cavity 228 merely by rotating the outer cylinder 288 so that the fluid outlet opening 298 faces in the desired direction. This capability can be useful when it is considered desirable to inject fluid in the same direction that the thermoplastic material is flowing. Further, depending upon the type of thermoplastic material or mold cavity geometry used, it may be desirable to inject the fluid in a different direction inside the mold cavity. Although the fluid flow passageway 234 is shown and described as opening into the mold cavity 228, it is contemplated that the fluid flow passageway 234 could open into any part of the is thermoplastic flow path.

Referring to FIG. 8, the invention also relates to a process for the injection molding of a thermoplastic article, the process comprising several steps. First, a mold is prepared and provided with a fluid flow passageway extending from an exterior surface of the mold to a thermoplastic flow path or mold cavity in the mold. A fluid inlet insert or plug is secured in an end of the fluid flow passageway, the plug comprising a porous core which is adapted to permit the flow of fluid therethrough but prevent the passage of thermoplastic therethrough. Next, the mold halves are clamped together and a molten thermoplastic resin is injected into the thermoplastic flow path, which can comprise a sprue passageway and a runner cavity, in a quantity sufficient to immerse the plug in molten thermoplastic material. Then, a low viscosity fluid such as a gas is injected through the fluid flow passageway, through the plug, and into the molten resin to distribute the molten resin within the mold cavity of the mold. The fluid is contained under pressure within the resin until the resin cools to a structurally self-supporting state to form a thermoplastic article. The fluid is then vented out of the article, through the plug and through the fluid flow passageway to a point outside the mold, whereby the plug prevents thermoplastic resin from passing through it and entering the fluid flow passageway. The mold halves are then separated and the article is removed from the mold.

It is believed that neither the molds nor the process of the invention require that a particular type of thermoplastic material be used. Successful production runs have been obtained with the following three types of thermoplastic resin: a palatable grade ABS, TPU filled with mica and having a B. F. Goodrich part number 59206, and an alloy of palatable grade ABS and mica-filled TPU, the alloy is having a Shulman Company part number FPU1376.

The mold and process of the present invention permit a low viscosity fluid such as a gas to be injected into a mold cavity or thermoplastic flow path via a fluid passageway extending through the mold. A rather inexpensive fluid inlet insert or plug is suitably inserted into the passageway at the end of the passageway. The plug permits gas to be injected through it and into the mold or vented out of the mold and through it to the passageway. Because the plug comprises a suitably porous material, the plug prevents thermoplastic from entering the passageway and eventually clogging the passageway.

If it is determined that the porous material of the plug does become substantially filled with thermoplastic, the plug can easily be removed and replaced. The plug 50 of the first embodiment is removed by merely unthreading the plug out of the enlarged portion of the gas passageway. The plug 150 of the second embodiment is removed by merely unthreading the two or four fasteners securing the plug to the stationary mold half. If the plug is changed at regular intervals (after a set number of production runs which number can be determined experimentally), it is believed that the entry of thermoplastic into the gas passageway can be prevented. Because the plug is not expensive and replacement of the plug is not labor intensive, overall manufacturing costs are believed to be lower than the overall manufacturing costs associated with the use of prior art processes and molds.

The invention thus provides an inexpensive and effective way of introducing a fluid such as a gas into a thermoplastic material in an injection molding process and mold. The invention eliminates expensive machined parts. Further, moving parts are eliminated from the fluid injection system in the mold, thus reducing repair and upkeep on the mold. Thirdly, the fluid injection system is free from is clogging. If clogging does occur, the clogged parts can be quickly and easily replaced with inexpensive parts. The outlet for the fluid delivery system can be placed anywhere in the mold without the necessity of expensive and sensitive heating systems. Finally, the fluid delivery system has a narrow profile and thus does not interfere or restrict water cooling lines or other items in the mold.

Reasonable variation and modification are possible within the scope of the foregoing specification and drawings without departing from the spirit of the invention.

The embodiments for which an exclusive property or privilege is claimed are defined as follows:

1. A mold for use in the gas-assisted injection molding of a thermoplastic article, the mold comprising:
   a cavity defining the shape of a thermoplastic article;
   at least one thermoplastic entry aperture which is adapted to receive molten thermoplastic resin from a nozzle of an injection molding machine;
   a thermoplastic flow path including a sprue passageway and runner in fluid communication with the thermoplastic entry aperture and with the cavity;
   a fluid flow passageway extending from an exterior surface of the mold to the thermoplastic flow path for communicating a low viscosity fluid to the thermoplastic flow path, said fluid flow passageway being spaced from said entry aperture and intersecting said flow path transversely thereof;
   a source of low viscosity fluid under pressure connected to the fluid flow passageway to supply a low viscosity fluid under pressure to the mold cavity through the fluid flow passageway;
   a plug disposed in an end portion of the fluid flow passageway adjacent the thermoplastic flow path, the plug comprising a porous core which is adapted to permit the flow of low viscosity fluid therethrough but prevent the passage of molten thermoplastic therethrough.

2. The mold of claim 1 wherein the end portion of the fluid flow passageway is threaded and the plug is threaded into the passageway end portion.

3. The mold of claim 1 wherein the fluid flow passageway extends transversely into the thermoplastic flow path at a point between the sprue passageway and the cavity.

4. The mold of claim 1 wherein the porous core comprises a sintered material.

5. The mold of claim 4 wherein the sintered material is selected from the group consisting of aluminum, copper, nickel, steel, bronze, porcelain and brass.

6. The mold of claim 1 wherein the plug comprises a hollow, threaded nut filled with a sintered material.

7. A mold according to claim 1 and further comprising a fluid pressure conduit connected to the fluid flow passageway for supplying fluid pressure thereto and to the thermoplastic flow path.

8. A mold according to claim 7 and further comprising an exhaust conduit connected to the fluid flow passageway for exhausting fluid from the fluid flow passageway and from the thermoplastic flow path.

9. A mold according to claim 8 wherein the exhaust conduit is connected to the fluid pressure conduit and further comprising a valve for selectively blocking the flow of fluid pressure through the fluid pressure conduit from the fluid pressure source and for exhausting the fluid pressure in the fluid flow passageway.

10. A mold for use in gas-assisted injection molding of a thermoplastic article, the mold comprising:
    a cavity defining the shape of a thermoplastic article;
    at least one thermoplastic entry aperture which is adapted to receive molten thermoplastic resin from a nozzle of an injection molding machine;
    a thermoplastic flow path in fluid communication with the thermoplastic entry aperture and with the cavity;
    a fluid flow passageway extending from an exterior surface of the mold to the cavity for communicating a lower viscosity fluid to the cavity, the fluid flow passageway being spaced laterally from and separate from the thermoplastic flow path;
    a plug mounted in an end portion of the fluid flow passageway adjacent the cavity, the plug comprising a porous core which is adapted to permit the flow of low viscosity fluid therethrough but prevent the passage of thermoplastic therethrough; and
    a source of fluid pressure connected to the fluid flow passageway to supply a low viscosity fluid under pressure to the mold cavity through the fluid flow passageway.

11. The mold of claim 10 wherein the end portion is threaded and the plug is threaded into the end portion.

12. The mold of claim 10 wherein the porous core comprises a sintered material.

13. The mold of claim 12 wherein the sintered material is selected from the group consisting of aluminum, brass, copper, nickel, steel, porcelain and bronze.

14. The mold of claim 10 wherein the plug comprises a hollow, threaded nut filled with a sintered material.

15. The mold of claim 10 and further comprising a selectively rotatable cylinder which is closed at its forward end with a cap, wherein the fluid flow passageway extends through the cylinder, and the cap extends into the cavity and has an opening which defines an outlet for the fluid flow passageway, whereby the outlet is adapted to face different directions within the cavity upon selective rotation of the cylinder to thereby permit directional control of a fluid injection into the cavity.

16. A mold according to claim 10 and further comprising an exhaust conduit connected to the fluid flow passageway for exhausting fluid from the fluid flow passageway and from the thermoplastic flow path.

17. A mold according to claim 16 and further comprising a valve for selectively blocking the flow of fluid pressure from the fluid pressure source and for exhausting the fluid pressure in the fluid flow passageway.

18. A mold for use in the gas-assisted injection molding of a thermoplastic article, the mold comprising:
    a cavity defining the shape of a thermoplastic article;
    at least one thermoplastic entry aperture which is adapted to receive molten thermoplastic resin from a nozzle of an injection molding machine;
    a thermoplastic flow path in fluid communication with the thermoplastic entry aperture and with the cavity;
    a fluid flow passageway extending from an exterior surface of the mold to the thermoplastic flow path for communicating a low viscosity fluid to the thermoplastic flow path;
    a source of low viscosity fluid under pressure connected to the fluid flow passageway to supply a low viscosity fluid under pressure to the mold cavity through the fluid flow passageway; and
    a plug disposed in an end portion of the fluid flow passageway with the end of the plug substantially flush with the walls of the mold defining the thermoplastic flow path, the plug comprising a porous core which is adapted to permit the flow of low viscosity fluid therethrough but prevent the passage of molten thermoplastic therethrough.

19. A mold for use in the gas-assisted injection molding of a thermoplastic article, the mold comprising:
    a cavity defining the shape of a thermoplastic article;

at least one thermoplastic entry aperture which is adapted to receive molten thermoplastic resin from a nozzle of an injection molding machine;

a thermoplastic flow path in fluid communication with the thermoplastic entry aperture and with the cavity;

a fluid flow passageway extending from an exterior surface of the mold to the thermoplastic flow path for communicating a low viscosity fluid to the thermoplastic flow path;

a plug disposed in an end portion of the fluid flow passageway adjacent the thermoplastic flow path, the plug comprising a porous core which is adapted to permit the flow of low viscosity fluid therethrough but prevent the passage of molten thermoplastic therethrough;

a selectively rotatable cylinder which is closed at its forward end with a cap, wherein the fluid flow passageway extends through the cylinder, the cap extends into the thermoplastic flow path and the cap has an opening which defines an outlet for the fluid flow passageway, whereby the outlet is adapted to face different directions within the thermoplastic flow path upon selective rotation of the cylinder to thereby permit directional control of the fluid injection into the thermoplastic flow path.

20. A mold for use in gas-assisted injection molding of a thermoplastic article, the mold comprising:

a cavity defining the shape of a thermoplastic article;

at least one thermoplastic entry aperture which is adapted to receive molten thermoplastic rein from a nozzle of an injection molding machine;

a thermoplastic flow path in fluid communication with the thermoplastic entry aperture and with the cavity;

a fluid flow passageway extending from an exterior surface of the mold to the cavity for communicating a lower viscosity fluid to the cavity;

a plug immovably mounted in the end of the fluid flow passageway with an end of said plug substantially flush with adjacent walls of the mold and forming a part of the cavity, the plug comprising a porous core which is adapted to permit the flow of low viscosity fluid therethrough but prevent the passage of thermoplastic therethrough; and a source of fluid pressure connected to the fluid flow passageway to supply a low viscosity fluid under pressure to the mold cavity through the fluid flow passageway.

* * * * *